(No Model.)

M. E. THOMAS & W. H. DENISON.
MILK BUCKET.

No. 516,319. Patented Mar. 13, 1894.

WITNESSES

Geo. M. Autum
Phill Masi

INVENTORS
Martin E. Thomas.
W. H. Denison.
by E. W. Anderson
their Attorney

UNITED STATES PATENT OFFICE.

MARTIN E. THOMAS AND WALTER H. DENISON, OF CUSHMAN, ARKANSAS.

MILK-BUCKET.

SPECIFICATION forming part of Letters Patent No. 516,819, dated March 13, 1894.

Application filed August 25, 1893. Serial No. 484,061. (No model.)

*To all whom it may concern:*

Be it known that we, MARTIN E. THOMAS and WALTER H. DENISON, citizens of the United States, and residents of Cushman, in the county of Independence and State of Arkansas, have invented certain new and useful Improvements in Milk-Buckets; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
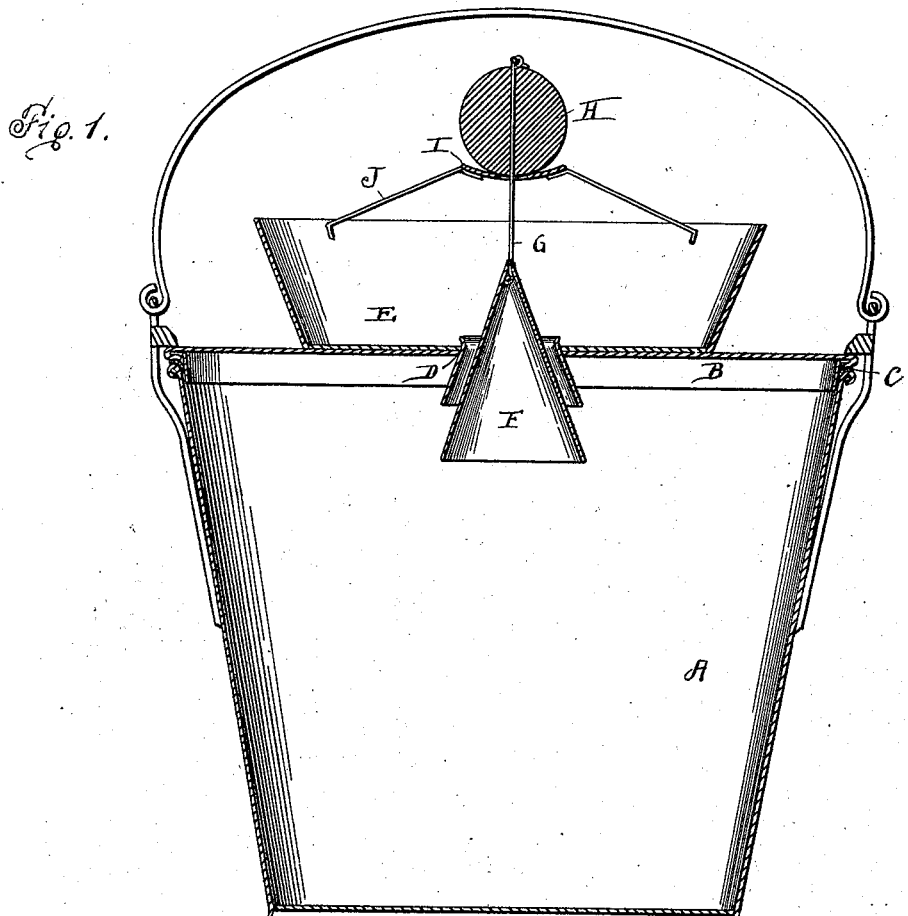
Figure 2:
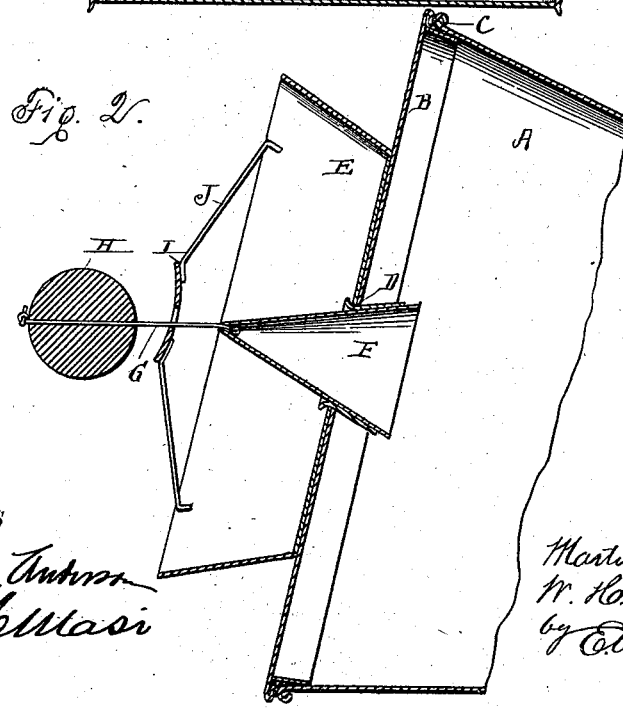

Figure 1 of the drawings is a vertical central section showing valve in its normal position. Fig. 2 is a central section showing the bucket partly broken away and inclined with valve displaced.

This invention has relation to certain new and useful improvements in milk buckets, and is designed to provide an article of this character having means whereby loss of milk by spilling is prevented should the bucket be kicked over by the cow during the operation of milking, or be otherwise overturned; and the invention consists in the novel construction and combination of parts, all as hereinafter described and pointed out in the appended claims.

The bucket A, as shown in the accompanying drawings, is provided with a tightly fitting cover B, a packing C being usually provided to cause said cover to form a liquid tight joint with the bucket, and to prevent its unseating. In the center of said cover is an opening D, and supported upon the cover is a receptacle or pan E, preferably of flaring form, and having an opening in its bottom corresponding to and registering with the opening D. Said openings are arranged to form a close fitting seat for a check valve F suspended within the bucket. In the drawings we have shown said valve as being in the form of a cone, but a spherical, or other suitable form of valve may be employed. Said valve is suspended within the bucket by means of a wire or loop G, which at its upper end is loosely attached to a weight H, normally supported upon a seat I, through an opening in the bottom of which is made the connection between the weight and the wire or loop G. The seat I is supported centrally of the pan or receptacle E by means of a spider-like frame J secured to the said pan or receptacle.

The length of the wire or loop G is such that when the bucket is in an upright, or in a slightly inclined position, the valve F is permitted to fall away from its seat, and the milk received in the pan or receptacle is free to run through into the bucket. Whenever however the bucket is overturned, or partially overturned, the weight H falls from its seat I, and draws the valve into its seat, preventing the escape of any milk from the bucket.

Having thus described our invention, what we claim as new, and desire to secure by Letters Patent, is—

1. A milk bucket having an opening in its cover, a valve arranged to close said opening from the inside, and adapted unless the vessel be overturned, to leave said opening open, and a movable weight connected to said valve and loosely seated above the said opening, whereby said weight, when the bucket is overturned, changes its position by gravity, and thereby brings the valve into position to close the said opening, substantially as specified.

2. A milk bucket having a tightly fitting cover, a pan or receptacle attached to and supported upon said cover, there being registering openings through said pan or receptacle and the cover, a valve arranged to close said openings from the inside, a suspension link or wire attached to said valve, a weight to which said link or wire is connected, and a support above the valve for said loosely seated weight, said weight being arranged, when the bucket is overturned, to move by gravity and close the said valve, substantially as specified.

In testimony whereof we affix our signatures in presence of two witnesses.

MARTIN E. THOMAS.
W. H. DENISON.

Witnesses:
WARREN C. MEEKS,
M. H. LONG.